United States Patent
Koshika et al.

(10) Patent No.: US 12,261,292 B2
(45) Date of Patent: Mar. 25, 2025

(54) POSITIVE ELECTRODE ACTIVE MATERIAL FOR LITHIUM ION SECONDARY BATTERY AND LITHIUM ION SECONDARY BATTERY

(71) Applicants: SUMITOMO METAL MINING CO., LTD., Tokyo (JP); PANASONIC CORPORATION, Kadoma (JP)

(72) Inventors: Yuki Koshika, Niihama (JP); Haruki Kaneda, Niihama (JP); Sho Tsuruta, Kadoma (JP); Takashi Ko, Kadoma (JP); Fumiharu Niina, Kadoma (JP)

(73) Assignees: SUMITOMO METAL MINING CO., LTD., Tokyo (JP); PANASONIC CORPORATION, Osaka (JP)

( * ) Notice: Subject to any disclaimer, the term of this patent is extended or adjusted under 35 U.S.C. 154(b) by 696 days.

(21) Appl. No.: 17/625,850

(22) PCT Filed: Jun. 30, 2020

(86) PCT No.: PCT/JP2020/025722
§ 371 (c)(1),
(2) Date: May 17, 2022

(87) PCT Pub. No.: WO2021/006124
PCT Pub. Date: Jan. 14, 2021

(65) Prior Publication Data
US 2023/0187624 A1 Jun. 15, 2023

(30) Foreign Application Priority Data
Jul. 8, 2019 (JP) .................................. 2019-127262

(51) Int. Cl.
*H01M 4/505* (2010.01)
*C01G 53/44* (2025.01)
(Continued)

(52) U.S. Cl.
CPC ............ *H01M 4/505* (2013.01); *C01G 53/44* (2013.01); *H01M 4/131* (2013.01); *H01M 4/525* (2013.01);
(Continued)

(58) Field of Classification Search
CPC ...... H01M 4/505; H01M 4/131; H01M 4/525; H01M 10/0525; H01M 2004/028
See application file for complete search history.

(56) References Cited

U.S. PATENT DOCUMENTS

2013/0189581 A1 7/2013 Imaizumi et al.
2015/0108397 A1 4/2015 Takeoka et al.
(Continued)

FOREIGN PATENT DOCUMENTS

CN 108028373 A 5/2018
JP 2002-151071 A 5/2002
(Continued)

OTHER PUBLICATIONS

Office Action dated Jan. 4, 2024, issued in counterpart CN Application No. 202080049430.6, with English translation. (13 pages).
(Continued)

*Primary Examiner* — Jane J Rhee
(74) *Attorney, Agent, or Firm* — WHDA, LLP (57) ABSTRACT

The positive electrode active material for a lithium ion secondary battery contains a lithium-nickel-manganese composite oxide, in which metal elements constituting the lithium-nickel-manganese composite oxide include lithium, nickel, manganese, cobalt, titanium, niobium, and optionally zirconium, an amount of substance ratio of the elements is represented as Li:Ni:Mn:Co:Zr:Ti:Nb=a:b:c:d:e:f:g (provided that, $0.97 \leq a \leq 1.10$, $0.80 \leq b \leq 0.88$, $0.04 \leq c \leq 0.12$, $0.04 \leq d \leq 0.10$, $0 \leq e \leq 0.004$, $0.003 < f \leq 0.030$, $0.001 < g \leq 0.006$,
(Continued)

and b+c+d+e+f+g=1), in the amount of substance ratio, (f+g)≤0.030 and f>g are satisfied.

8 Claims, 3 Drawing Sheets

(51) Int. Cl.
    *H01M 4/131*     (2010.01)
    *H01M 4/525*     (2010.01)
    *H01M 10/0525*     (2010.01)
    *H01M 4/02*     (2006.01)

(52) U.S. Cl.
    CPC ..... *H01M 10/0525* (2013.01); *C01P 2002/52* (2013.01); *C01P 2002/85* (2013.01); *C01P 2004/04* (2013.01); *C01P 2004/50* (2013.01); *C01P 2004/52* (2013.01); *C01P 2004/61* (2013.01); *C01P 2006/40* (2013.01); *H01M 2004/028* (2013.01)

(56) References Cited

U.S. PATENT DOCUMENTS

| | | |
|---|---|---|
| 2018/0233739 A1 | 8/2018 | Park et al. |
| 2019/0252680 A1 | 8/2019 | Ando et al. |
| 2020/0251733 A1 | 8/2020 | Takano et al. |
| 2020/0259177 A1 | 8/2020 | Nakamura et al. |
| 2020/0358094 A1 | 11/2020 | Oshita et al. |
| 2021/0135199 A1 | 5/2021 | Washida et al. |
| 2021/0280864 A1 | 9/2021 | Kaneda et al. |
| 2021/0305569 A1 | 9/2021 | Ando et al. |

FOREIGN PATENT DOCUMENTS

| | | |
|---|---|---|
| JP | 2005-093371 A | 4/2005 |
| JP | 2006-147499 A | 6/2006 |
| JP | 2007-265784 A | 10/2007 |
| JP | 2008-017729 A | 1/2008 |
| JP | 2008-117729 A | 5/2008 |
| JP | 2008-257902 A | 10/2008 |
| JP | 4807467 B1 | 11/2011 |
| JP | 2015-099767 A | 5/2015 |
| JP | 2016-051583 A | 4/2016 |
| JP | 2016-139583 A | 8/2016 |
| JP | 6201277 B2 | 9/2017 |
| JP | 2017-183055 A | 10/2017 |
| JP | 2018-018789 A | 2/2018 |
| JP | 2018-116817 A | 7/2018 |
| WO | 2018/043669 A1 | 3/2018 |
| WO | 2019/035418 A1 | 2/2019 |
| WO | 2019/039567 A1 | 2/2019 |
| WO | 2019/065566 A1 | 4/2019 |
| WO | 2019/131779 A1 | 7/2019 |

OTHER PUBLICATIONS

Office Action dated Aug. 20, 2024, issued in counterpart JP Application No. 2021-530629, with English translation. (8 pages).
International Search Report dated Aug. 25, 2020, issued in counterpart application No. PCT/JP2020/025722. (5 pages).
International Preliminary Report on Patentability (Form PCT/IB/373) issued in counterpart International Application No. PCT/JP2020/025722 dated Jan. 11, 2022, with Form PCT/ISA/237. (8 pages).

POSITIVE ELECTRODE ACTIVE MATERIAL FOR LITHIUM ION SECONDARY BATTERY AND LITHIUM ION SECONDARY BATTERY

TECHNICAL FIELD

The present invention relates to a positive electrode active material for a lithium ion secondary battery and a lithium ion secondary battery.

BACKGROUND ART

In recent years, with widespread use of a portable electronic device such as a mobile phone terminal or a notebook personal computer, development of a small and lightweight non-aqueous electrolyte secondary battery having a high energy density and durability has been strongly desired. Furthermore, development of high-output secondary batteries as batteries for electric tools and electric cars including hybrid cars has been strongly desired.

As a secondary battery satisfying such requirement, there is a non-aqueous electrolyte secondary battery such as a lithium ion secondary battery. A lithium ion secondary battery using a lithium-metal composite oxide having a layered or spinel type crystal structure as a positive electrode active material can obtain a high voltage of 4 V-class and therefore has been put into practical use as a battery having a high energy density.

As the lithium-metal composite oxide, lithium-cobalt composite oxide ($LiCoO_2$) that is relatively easily synthesized, lithium-nickel composite oxide ($LiNiO_2$), lithium-nickel-cobalt-manganese composite oxide ($LiNi_{1/3}Co_{1/3}Mn_{1/3}O_2$) using nickel that is cheaper than cobalt, lithium-manganese composite oxide ($LiMn_2O_4$), lithium-nickel-manganese composite oxide ($LiNi_{0.5}Mn_{0.5}O_2$) using manganese, and the like have been proposed.

However, when a non-aqueous electrolyte is used as a battery material of a lithium ion secondary battery, high thermal stability is required. For example, when short circuit occurs inside a lithium ion secondary battery, heat is generated by a rapid current, and therefore higher thermal stability is required.

In this regard, lithium-nickel-cobalt-manganese composite oxide, lithium-nickel-manganese composite oxide, or the like that is excellent in thermal stability has recently attracted attention. The lithium-nickel-cobalt-manganese composite oxide is a layered compound as lithium-cobalt composite oxide, lithium-nickel composite oxide, and the like and refers to a ternary system positive electrode active material in which a composition ratio of nickel, cobalt, and manganese at the transition metal site is 1:1:1.

Particularly, in recent years, aiming at capacity enlargement, a ternary system positive electrode active material or a positive electrode active material (Hi-Ni positive electrode material) obtained by increasing a nickel ratio of a lithium-nickel-manganese composite oxide to have a high nickel ratio has attracted attention. However, since an increase in battery capacity depending on the nickel ratio causes a trade-off with a decrease in thermal stability, a positive electrode active material with high performances as a lithium ion secondary battery (such as high cycle characteristics, a high capacity, and a high output), short circuit resistance, and thermal stability achieved at the same time is required.

There have been proposed some techniques of adding niobium to a lithium-metal composite oxide in order to improve thermal stability. For example, in Patent Literature 1, there has been proposed a positive electrode active material for a non-aqueous secondary battery, which is formed of a composition containing at least one or more compounds that are represented by a general formula: $Li_aNi_{1-x-y-z}Co_xM_yNb_zO_b$ (where M is one or more elements selected from the group consisting of Mn, Fe and Al, $1 \leq a \leq 1.1$, $0.1 \leq x \leq 0.3$, $0 \leq y \leq 0.1$, $0.01 \leq z \leq 0.05$, and $2 \leq b \leq 2.2$) and composed of lithium, nickel, cobalt, an element M, niobium, and oxygen. According to Patent Literature 1, a positive electrode active material having high thermal stability and a large discharge capacity is supposed to be obtained since a Li—Nb—O-based compound existing in the vicinity of surfaces of particles or inside the particles has high thermal stability.

Furthermore, Patent Literature 2 has proposed a positive electrode active material for a non-aqueous electrolyte secondary battery, the positive electrode active material formed of lithium-metal composite oxide powder represented by general formula: $Li_xNi_{1-y-z}MnCo_yM_zO_2$ (provided that, $0.96 \leq x \leq 1.03$, $0.05 < y \leq 0.20$, $0 < z \leq 0.10$, M is at least one or more metal elements selected from the group consisting of V, Cr, Fe, and Mn), in which a ratio (Li/Me) of the sum (Me) of number of atoms of metal elements other than Li (that is, the number of atoms of Ni, Co, and M metal element) and the number of atoms of Li is 1.01 to 1.10, and when the positive electrode active material for a non-aqueous electrolyte secondary battery is immersed in water, lithium eluted in water is 0.1 wt % or less. According to Patent Literature 2, a positive electrode active material for a non-aqueous electrolyte secondary battery having a high capacity and excellent cycle characteristics and less eluted alkaline component is supposed to be obtained.

CITATION LIST

Patent Literature

Patent Literature 1: JP 2002-151071 A
Patent Literature 2: JP 6201277 B2
Patent Literature 3: JP 2008-017729 A
Patent Literature 4: JP 4807467 B1
Patent Literature 5: JP 2006-147499 A
Patent Literature 6: JP 2007-265784 A
Patent Literature 7: JP 2008-257902 A

SUMMARY OF INVENTION

Technical Problem

It is described that the positive electrode active material described in Patent Literature 1 above contain niobium in a specific form so as to improve thermal stability, but a further improvement in thermal stability in lithium-nickel-manganese composite oxide having a high nickel ratio is required. Furthermore, since niobium is expensive, a positive electrode active material capable of achieving high thermal stability at lower cost is required.

Furthermore, the positive electrode active material described in Patent Literature 2 above is supposed such that by replacing a part of nickel with a specific transition metal and water-washing the active material after firing, the eluted alkaline component is reduced, and gelling in paste preparation for producing a battery electrode plate can be prevented. However, in Patent Literature 2 above, there is no description of an effect relating to thermal stability.

The present invention has been achieved in view of these circumstances. An object of the present invention is to achieve higher thermal stability at low cost in a positive electrode active material containing lithium-nickel-manganese composite oxide having a high nickel ratio and to prevent the gelling at the time of preparing a paste by reducing the eluted alkaline component. Furthermore, another object of the present invention is to provide a method capable of producing such a positive electrode active material easily in industrial scale production.

There have been proposed some techniques of adding, for example, titanium to lithium-metal composite oxide in order to obtain a positive electrode active material having high battery characteristics. According to Patent Literatures 3 to 7, a positive electrode active material formed of lithium-nickel-cobalt-titanium composite oxide has favorable thermal stability and a high battery capacity.

However, in Patent Literatures 1 to 7 above, there is no description of an effect obtained by containing a combination of niobium and titanium as heterogeneous elements in lithium-nickel-manganese composite oxide.

Solution to Problem

According to a first aspect of the present invention, there is provided a positive electrode active material for a lithium ion secondary battery, the positive electrode active material containing a lithium-nickel-manganese composite oxide having a hexagonal layered structure and configured by secondary particles with a plurality of aggregated primary particles, in which metal elements constituting the lithium-nickel-manganese composite oxide include lithium (Li), nickel (Ni), manganese (Mn), cobalt (Co), titanium (Ti), niobium (Nb), and optionally zirconium (Zr), an amount of substance ratio of the metal elements is represented as Li:Ni:Mn:Co:Zr:Ti:Nb=a:b:c:d:e:f:g (provided that, $0.97 \leq a \leq 1.10$, $0.80 \leq b \leq 0.88$, $0.04 \leq c \leq 0.12$, $0.04 \leq d \leq 0.10$, $0 \leq e \leq 0.004$, $0.003 < f \leq 0.030$, $0.001 < g \leq 0.006$, and $b+c+d+e+f+g=1$), in the amount of substance ratio, $(f+g) \leq 0.030$ and $f > g$ are satisfied, niobium is segregated at a grain boundary between primary particles of the lithium-nickel-manganese composite oxide, and an amount of lithium to be eluted in water when the positive electrode active material is immersed in water is 0.20% by mass or less with respect to the entire positive electrode active material.

Furthermore, the amount of substance ratio of the metal elements may be represented as Li:Ni:Mn:Co:Zr:Ti:Nb=a:b:c:d:e:f:g (provided that, $0.97 \leq a \leq 1.10$, $0.80 \leq b \leq 0.88$, $0.04 \leq c \leq 0.12$, $0.04 \leq d \leq 0.10$, $0 \leq e \leq 0.004$, $0.003 < f \leq 0.030$, $0.003 \leq g \leq 0.006$, and $b+c+d+e+f+g=1$). Furthermore, the amount of lithium eluted when the positive electrode active material is immersed in water is preferably 0.10% by mass or less with respect to the whole positive electrode active material. Furthermore, it is preferable that a niobium concentration at the grain boundary between primary particles, as determined by point analysis using STEM-EDX, with respect to a niobium concentration inside primary particles of the lithium-nickel-manganese composite oxide is 1.3 times or more. Furthermore, it is preferable that a titanium concentration at the grain boundary between primary particles, as determined by point analysis using STEM-EDX, with respect to a titanium concentration inside primary particles of the lithium-nickel-manganese composite oxide is less than 1.3 times. Furthermore, it is preferable that [(D90−D10)/Mv] indicating a particle size distribution width calculated by D90, D10 and a volume average particle size (Mv) in a particle size distribution by a laser diffraction scattering method is 0.80 or more and 1.20 or less. Furthermore, it is preferable that the volume average particle size Mv is 8 μm or more and 20 μm or less.

According to a second aspect of the present invention, there is provided a lithium ion secondary battery including a positive electrode, a negative electrode, and a non-aqueous electrolyte, the positive electrode containing the above-described positive electrode active material for a lithium ion secondary battery.

Advantageous Effects of Invention

According to the present invention, it is possible to provide a positive electrode active material that can achieve extremely high thermal stability at low cost and is less likely gelled at the time of preparing a paste. Furthermore, the present invention can easily produce such a positive electrode active material in industrial scale production, and is considered to be extremely industrially valuable.

DESCRIPTION OF EMBODIMENTS

Hereinafter, regarding the present embodiment, a positive electrode active material for a lithium ion secondary battery, a method for producing the same, and a lithium ion secondary battery using the positive electrode active material will be described.

1. Positive Electrode Active Material for Lithium Ion Secondary Battery

A positive electrode active material for a lithium ion secondary battery (hereinafter, also referred to as "positive electrode active material") according to the present embodiment contains a lithium-nickel-manganese composite oxide having a hexagonal layered structure and configured by secondary particles with a plurality of aggregated primary particles. Metal elements constituting the lithium-nickel-manganese composite oxide include lithium (Li), nickel (Ni), manganese (Mn), titanium (Ti), niobium (Nb), and optionally zirconium (Zr).

Particularly, when a combustible non-aqueous electrolyte is used as a constituent material of the lithium ion secondary battery, the lithium ion secondary battery is required to have high thermal stability. Furthermore, in a lithium ion secondary battery, when short circuit occurs between a positive electrode and a negative electrode in a charged state, a current rapidly flows to generate large heat. As a result, a chain may occur in which a positive electrode active material is decomposed to further generate heat. Therefore, by using a positive electrode active material that has high structure stability in an overcharged state and is less likely to be decomposed even in a high-temperature state, oxygen releasing caused by thermal decomposition of the positive electrode active material is suppressed, so that thermal stability can be enhanced.

The present inventors have conducted intensive studies, and as a result, have found that particularly, by combining specific amounts of titanium (Ti) and niobium (Nb) and containing them in a specific distribution in lithium-nickel-manganese composite oxide to be used in a positive electrode active material, oxygen releasing at the time of overcharge of the positive electrode active material is suppressed, and both high thermal stability and a low eluted alkali amount can be achieved by water-washing the active material containing titanium and niobium to reduce the eluted alkali amount, thereby completing the present invention. Hereinafter, a configuration of the positive electrode active material according to the present embodiment will be described in detail.

[Lithium-Nickel-Manganese Composite Oxide]

The lithium-nickel-manganese composite oxide contained in the positive electrode active material is configured by secondary particles with a plurality of aggregated primary particles. Furthermore, the lithium-nickel-manganese composite oxide has a hexagonal layered structure.

Metal elements constituting the lithium-nickel-manganese composite oxide include lithium (Li), nickel (Ni), manganese (Mn), cobalt (Co), titanium (Ti), niobium (Nb), and optionally zirconium (Zr).

The amount of substance ratio (molar ratio) of metal elements constituting the lithium-nickel-manganese composite oxide is represented as Li:Ni:Mn:Co:Zr:Ti:Nb=a:b:c:d:e:f:g (provided that, $0.97 \leq a \leq 1.10$, $0.80 \leq b \leq 0.88$, $0.04 \leq c \leq 0.12$, $0.04 \leq d \leq 0.10$, $0 \leq e \leq 0.004$, $0.003 < f \leq 0.030$, $0.001 < g \leq 0.006$, and $b+c+d+e+f+g=1$). Furthermore, in the above-described amount of substance ratio, "f" indicating the amount of substance ratio of titanium (Ti) and "g" indicating the amount of substance ratio of niobium (Nb) satisfy relations of $(f+g) \leq 0.030$ and $f > g$. Hereinafter, compositions of the respective metal elements will be described.

(Lithium)

In the above-described amount of substance ratio, "a" indicating the amount of substance ratio of Li corresponds to the amount of substance ratio (Li/Me) of Li and the metal element Me other than lithium (that is, Ni, Mn, Co, Zr, Ti, and Nb). Furthermore, the range of "a" is $0.97 \leq a \leq 1.10$, and preferably $1.00 \leq a \leq 1.05$. When the value of "a" is in the above range, the reaction resistance of the positive electrode is decreased, and the output of the battery can be improved. Furthermore, the range of "a" may be $1.00 \leq a \leq 1.03$.

(Nickel)

In the above-described amount of substance ratio, the range of "b" indicating the amount of substance ratio of Ni is $0.80 \leq b \leq 0.88$, preferably $0.80 \leq b \leq 0.85$, and more preferably $0.81 \leq b \leq 0.84$. When the value of "b" is in the above range, a high battery capacity and high thermal stability can be attained. On the other hand, when the value of "b" is less than 0.80, the amount of redoxable transition metal is decreased, and thus a battery capacity is decreased. Furthermore, when the value of "b" exceeds 0.88, thermal stability may be decreased.

(Manganese)

In the above-described amount of substance ratio, the range of "c" indicating the amount of substance ratio of Mn is $0.04 \leq c \leq 0.12$, preferably $0.06 \leq c \leq 0.12$, and more preferably $0.07 \leq c \leq 0.11$. When the value of "c" is in the above range, a high battery capacity and high thermal stability can be attained. On the other hand, when the value of "c" is less than 0.04, the thermal stability improving effect may not be obtainable. Furthermore, when the value of "c" exceeds 0.12, the battery capacity is decreased. Furthermore, by containing manganese in the above range, in the firing process (S20) to be described below, the firing temperature can be rised, and the dispersion of titanium or the like can be promoted.

(Cobalt)

In the above-described amount of substance ratio, the range of "d" indicating the amount of substance ratio of Co is $0.04 \leq d \leq 0.10$, preferably $0.04 \leq d \leq 0.08$, and more preferably $0.04 \leq d \leq 0.07$. When the value of "d" is in the above range, high thermal stability and output characteristics can be attained. On the other hand, when the value of "d" is less than 0.04, the improving effect of thermal stability or output characteristics may not be obtainable. Furthermore, when the value of "d" exceeds 0.10, the ratio of Ni or Mn is relatively decreased to decrease a battery capacity.

(Zirconium)

In the above-described amount of substance ratio, the range of "e" indicating the amount of substance ratio of Zr is $0 \leq e \leq 0.004$, preferably $0 \leq e \leq 0.0038$, and more preferably $0 \leq e \leq 0.0035$. The value of "e" may be 0 and may exceed 0. When the value of "e" exceeds 0, output characteristics or durability can be improved. On the other hand, when the value of "e" exceeds 0.004, the ratio of Ni or Mn is relatively decreased to decrease a battery capacity.

(Titanium)

In the above-described amount of substance ratio, the range of "f" indicating the amount of substance ratio of Ti is $0.003 \leq f \leq 0.030$, preferably $0.010 \leq f \leq 0.030$, and further preferably $0.020 \leq f \leq 0.030$. When titanium is contained in the above range along with niobium, as compared with the case of containing each element alone, oxygen releasing when used in a positive electrode of a secondary battery is suppressed, so that high thermal stability can be obtained. On the other hand, when the value of "f" is 0.003 or less, the thermal stability improving effect is not sufficient. Furthermore, when the value of "f" exceeds 0.030, the ratio of Ni or Mn is relatively decreased, the crystal structure is not stable, and cationic mixing is likely to occur, so that the battery capacity is greatly decreased.

(Niobium)

In the above-described amount of substance ratio, the range of "g" indicating the amount of substance ratio of Nb is $0.001 < g \leq 0.006$, and preferably $0.003 \leq g \leq 0.006$, and may be $0.003 \leq g \leq 0.005$. By containing niobium in the above range along with titanium, even when a small content of niobium is used, oxygen releasing when used in a positive electrode of a secondary battery is suppressed, so that high thermal stability can be attained.

Furthermore, in the above-described amount of substance ratio, the sum (f+g) of the amount of substance ratio (f) of titanium and the amount of substance ratio (g) of niobium is 0.030 or less. When "f+g" is in the above range, a higher battery capacity can be obtained while high thermal stability is attained.

Furthermore, regarding the above-described amount of substance ratio, the amount of substance ratio (g) of niobium is smaller than the amount of substance ratio (f) of titanium (f>g), $f \leq 2g$ is preferable, $f \leq 3g$ is more preferable, and $f \leq 4g$ is further preferable. Since niobium is a more expensive element than titanium, by decreasing the content of niobium to be smaller than that of titanium, production cost can be reduced, and by combining niobium with titanium, high thermal stability can be attained.

Note that, the composition of the lithium-nickel-manganese composite oxide can be measured by quantitative analysis using inductive coupled plasma (ICP) emission spectrometry.

(Distribution of Niobium)

Niobium (Nb) contained in the lithium-nickel-manganese composite oxide according to the present embodiment is preferably segregated to a grain boundary between primary particles. The segregation of niobium can be checked, for example, by subjecting the composition of cross-sections of primary particles to surface analysis/line analysis to detect the concentration of niobium at the grain boundary between primary particles by energy dispersive X-ray spectroscopy using a scanning transmission electron microscope (STEM-EDX). Note that, a part of niobium may exist inside primary particles.

Furthermore, the niobium concentration at the grain boundary between primary particles, as determined by STEM-EDX, with respect to the niobium concentration inside primary particles is preferably 1.3 times or more and more preferably 1.5 times or more. Note that, the upper Limit of the niobium concentration is not particularly limited, and for example, is 5 times or less.

Note that, the concentration of niobium inside primary particles or at the grain boundary can be confirmed by surface analysis/line analysis/point analysis of the composition of cross sections of a plurality of secondary particles by STEM-EDX measurement.

For example, the niobium concentration at a grain boundary between primary particles can be obtained by randomly selecting twenty regions including the grain boundary between primary particles (for example, regions that are regions of 130 nm×130 nm and include the grain boundary so that the grain boundary crosses in the region)) from cross-sections of a plurality of secondary particles, confirming the composition of each region by point analysis, and calculating an average value thereof. Furthermore, similarly, when the niobium concentration in primary particles is measured, the niobium concentration can be obtained by randomly selecting twenty regions inside the primary particles (for example, regions of 130 nm×130 nm and not including the grain boundary), confirming the composition of each region by point analysis, and calculating an average value thereof.

(Distribution of Titanium)

The distribution of titanium (Ti) contained in the lithium-nickel-manganese composite oxide according to the present embodiment is not particularly limited, titanium may exist on at least one of the inside and the grain boundary of primary particles or may be solid-solved inside primary particles. However, from the viewpoint of improving a battery capacity in a secondary battery, titanium is preferably solid-solved. Herein, the state where titanium is solid-solved indicates, for example, a state where titanium is detected inside primary particles by surface analysis of secondary particle cross-section by using STEM-EDX and condensation of titanium at the interface of primary particles is not confirmed, and it is preferable that titanium is detected over all cross-sections inside primary particles.

For example, the titanium concentration at the grain boundary between primary particles, as determined by STEM-EDX, with respect to the titanium concentration inside primary particles is preferably less than 1.3 times, and may be 1.2 times or less or may be 1.0 time or less. Furthermore, the lower limit of the titanium concentration at the grain boundary between primary particles with respect to the titanium concentration inside primary particles may be 0.8 times or more and 1.2 times or less, and may be 0.9 or more and 1.1 times or less. Note that, the titanium concentration can be measured by surface analysis using STEM-EDX, similarly to the niobium concentration described above.

Note that, in the lithium-nickel-manganese composite oxide according to the present embodiment, the distribution of metal elements other than niobium (Nb) and titanium (Ti) described above is not particularly limited, and for example, Ni, Mn, and Co are preferably detected over all cross-sections inside a plurality of primary particles constituting the secondary particles.

[Volume Average Particle Size (Mv)]

The volume average particle size (Mv) of the positive electrode active material according to the present embodiment is preferably 8 μm or more and 20 μm or less, and more preferably 10 μm or more and 17 μm or less. When the volume average particle size Mv is in the above range, it is possible to achieve both high output characteristics and battery capacity and high filling property to the positive electrode when the positive electrode active material is used in the positive electrode of a secondary battery.

Meanwhile, when the volume average particle size Mv is less than 8 μm, high filling properties to the positive electrode cannot be obtained in some cases. Furthermore, when the volume average particle size (Mv) exceeds 20 μm, high output characteristics and battery capacity may not be obtained in some cases. Note that, the average particle size can be determined from, for example, a volume integrated value measured by a laser light diffraction scattering type particle size distribution analyzer.

[(D90−D10)/Mv] (particle size distribution width)

Furthermore, it is preferable that in the positive electrode active material according to the present embodiment, [(D90−D10)/Mv] calculated by D90 and D10 and a volume average particle size (Mv) in a particle size distribution by a laser diffraction scattering method is 0.80 or more and 1.20 or less. Furthermore, [(D90−D10)/Mv] indicates a particle size distribution width of particle sizes of particles constituting the positive electrode active material. Note that, D90, D10, and Mv mean the particle size (D90) at 90% and the particle size (010) at 10% in volume integration of particle amounts in a particle size distribution curve, and the volume average particle size (Mv), respectively.

When the particle size distribution of the particles constituting the positive electrode active material is in a wide range, there are many fine particles each having a particle size smaller than the volume average particle size (Mv) and many coarse particles each having a particle size larger than the average particle size. Therefore, when the particle size distribution width is in the above range, fine particles and coarse particles are mixed, a packing density is increased, and an energy density per volume can be increased. The method for producing a positive electrode active material having the particle size distribution width is not limited, but, for example, the positive electrode active material can be obtained by producing a nickel-manganese composite compound to be used in the mixing process (S10) described below by a continuous crystallization method.

On the other hand, when the particle size distribution width of the positive electrode active material is less than 0.80, the volume energy density is decreased. The upper limit of the particle size distribution width is not particularly limited, and for example, is about 1.20. Note that, in the firing process (S20) described below, when the firing temperature exceeds 1000° C., the particle size distribution width may exceed 1.20. In this case, when the positive electrode active material is formed, the specific surface area is decreased to increase the resistance of the positive electrode so that the battery capacity may be decreased.

[Eluted Lithium Amount]

In the positive electrode active material according to the present embodiment, by decreasing the eluted lithium amount to a specific amount, the crystallinity of the positive electrode active material is improved and a discharge capacity is improved, and gelling of the positive electrode mixture paste at the time of producing an electrode plate of a secondary battery can be suppressed.

In the positive electrode active material according to the present embodiment, the amount of lithium to be eluted in water when the positive electrode active material is immersed in water (eluted lithium amount) is 0.20% by mass or less with respect to the entire positive electrode active material, preferably 0.10% by mass or less, and further preferably 0.08% by mass or less. Furthermore, the lower limit of the eluted lithium amount is not particularly limited, and for example, is 0.01% by mass or more. When the eluted lithium amount is in the above range, excessive lithium in the lithium-nickel-manganese composite oxide is pulled out, occurrence of gelling of the positive electrode mixture paste, or the like can be suppressed. Note that, when the eluted lithium amount is less than 0.01% by mass, lithium may be pulled out excessively from the lithium-nickel-manganese composite oxide at the time of water-washing, and battery characteristics may deteriorate. Furthermore, the eluted lithium amount may be 0.06% by mass or less.

Note that, the eluted lithium amount can be measured by fractionating 2 g of the positive electrode active material, putting the positive electrode active material into 125 ml of pure water at room temperature stirred with a stirrer, and performing titration using an HCl aqueous solution immediately after putting the positive electrode active material thereinto. The titration is evaluated by the Warder method, the lithium hydroxide (LiOH) amount and the lithium carbonate ($Li_2CO_3$) amount are calculated, and the sum of these lithium amounts is calculated as eluted lithium. Furthermore, the eluted lithium amount can be adjusted to the above range, for example, by water-washing the lithium-nickel-manganese composite oxide obtained by firing.

[Specific Surface Area]

Further, it is preferable that, in the positive electrode active material according to the present embodiment, a specific surface area as measured by a BET method is 0.4 $m^2/g$ or more and 2.0 $m^2/g$ or less. When the specific surface area is in the above range, the number of coming-in and -out sites of Li ion contributing to reaction when charging and discharging is increased, a battery capacity can be increased as compared with a case where the specific surface area is less than 0.4 $m^2/g$. On the other hand, when the specific surface area exceeds 2.0 $m^2/g$ in the positive electrode active material having a high nickel ratio, also in the case of removing the eluted alkaline component on the particle surface once by performing the water-washing process (S30) described below, the alkaline component derived from lithium eluted from the particle surface by reaction with moisture in air may be increased. When the positive electrode mixture paste is produced using such a positive electrode active material, the positive electrode mixture paste is gelled, and thus it becomes difficult to produce a positive electrode in some cases. Furthermore, the upper limit of the specific surface area of the positive electrode active material may be, for example, 1.5 $m^2/g$ or less. For example, by performing the water-washing process (S30) and the drying process (S40) described below, the specific surface area thereof can be increased as compared with lithium-nickel-manganese composite oxide before water-washing.

[Maximum Oxygen Generation Peak Temperature]

The maximum oxygen generation peak temperature of the positive electrode active material according to the present embodiment in an overcharged state at the time of rising the temperature is preferably 250° C. or higher. The upper limit of the maximum oxygen generation peak temperature at the time of rising the temperature is not particularly limited, and is about 300° C. or lower. Note that, the maximum oxygen generation peak temperature can be measured by the method described in Examples. Furthermore, the maximum oxygen generation peak temperature refers to a peak temperature at which oxygen generated at the time of rising the temperature becomes a local and global maximum.

[Maximum Oxygen Releasing Rate]

The maximum oxygen releasing rate of the positive electrode active material according to the present embodiment in an overcharged state at the time of rising the temperature is desirably low. The maximum oxygen releasing rate is preferably 60% or less and more preferably 50% or less when the positive electrode active material produced under the same condition, except for titanium and niobium being not added and the firing temperature being adjusted according to the composition, is regarded as 100%. The lower limit of the maximum oxygen releasing rate at the time of rising the temperature is not particularly limited, and is about 0.1% or more. Note that, the maximum oxygen releasing rate can be measured by the method described in Examples. Furthermore, the maximum oxygen releasing rate refers to a weight reduction rate at a time when the absolute value obtained by differentiating weight reduction at the time of rising the temperature by time becomes a maximum. Note that, the firing temperature adjusted according to the composition refers to a temperature range in which a discharge capacity becomes highest (that is, a temperature range in which crystallinity is sufficiently increased) in the composition and generally tends to increase as the amount of the additive element is increased.

[Thermal Runaway Temperature]

In a lithium ion battery using the positive electrode active material according to the present embodiment, a thermal runaway temperature measured by accelerated rate calorimeter (ARC) in a charged state is desired to be high. The thermal runaway temperature is preferably +8° C. or higher and more preferably +10° C. or higher based on the thermal runaway initiation temperature of the positive electrode active material produced under the same condition, except for titanium and niobium being not added and the firing temperature being adjusted according to the composition. The upper limit of the thermal runaway temperature is not particularly limited. Note that, the thermal runaway temperature can be measured by the method described in Examples. Furthermore, the thermal runaway temperature refers to a temperature when heat generation rate in ARC measurement exceeds 10° C./min.

Figure 1:
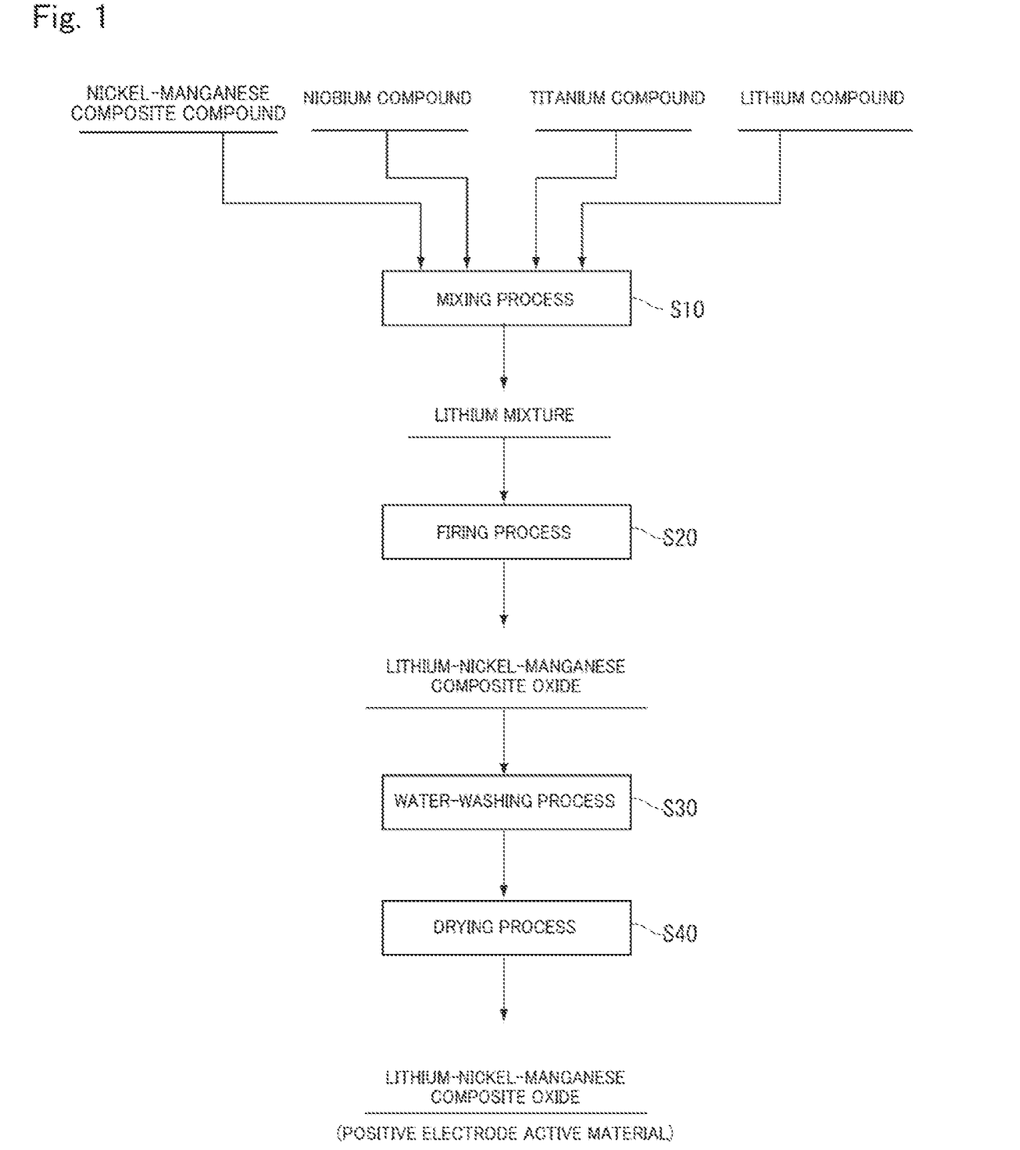
FIG. 1 is a diagram illustrating an example of the method for producing a positive electrode active material according to the present embodiment.
Figure 2A:
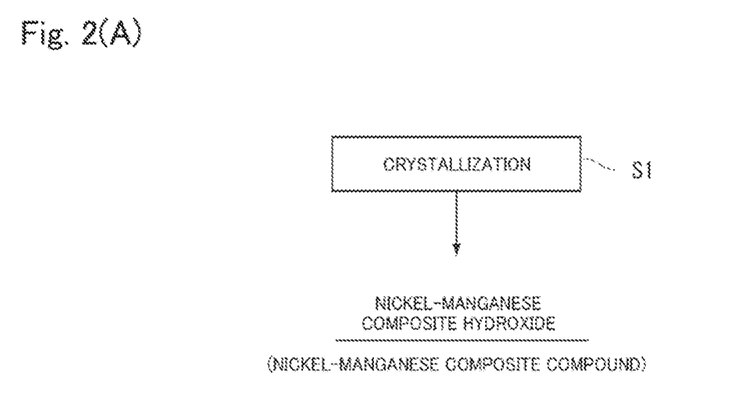
FIG. 2(A) and FIG. 2(B) are diagrams illustrating an example of a method for producing a nickel-manganese composite compound according to the present embodiment.
Figure 2B:
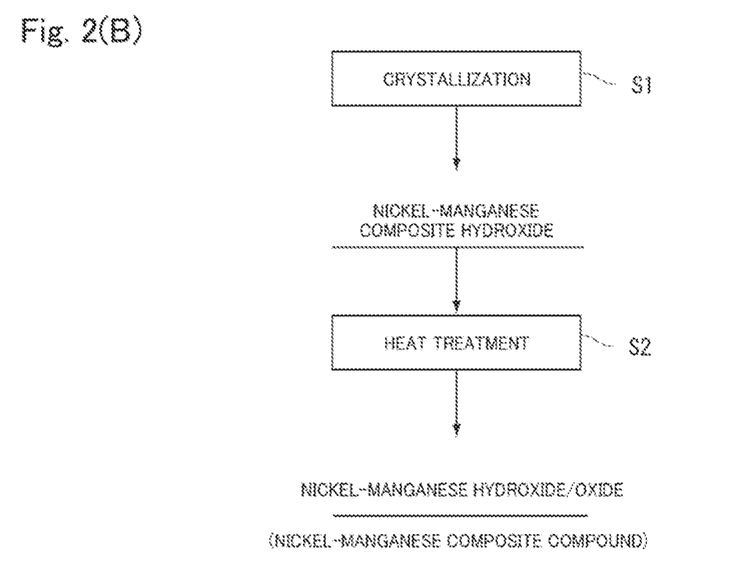

2. Method for Producing Positive Electrode Active Material for Lithium Ion Secondary Battery FIGS. 1, 2(A), and 2(B) are diagrams illustrating examples of a method for producing a positive electrode active material for a lithium ion secondary battery according to the present embodiment (hereinafter, also referred to as "method for producing a positive electrode active material"). The obtained positive electrode active material contains lithium-nickel-manganese composite oxide configured by secondary particles with a plurality of aggregated primary particles. Furthermore, by this production method, a positive electrode active material containing the above-described lithium-nickel-manganese composite oxide can be easily produced on an industrial scale. Note that, the following description is an example of the production method according to the present embodiment and does not limit the production method.

As illustrated in FIG. 1, the production method according to the present embodiment may include a mixing process (S10) of mixing at least a nickel-manganese composite compound, a titanium compound, a niobium compound, and a lithium compound to obtain a mixture, a firing process (S20) of firing the mixture to obtain the lithium-nickel-manganese composite oxide, a water-washing process (S30) of water-washing the lithium-nickel-manganese composite oxide obtained after firing, and a drying process (S40) of drying the lithium-nickel-manganese composite oxide obtained after water-washing.

Furthermore, the nickel-manganese composite compound to be used in the mixing process (S10) may be obtained, for example, as illustrated in FIG. 2(A) and FIG. 2(B), by a method including a crystallization process (S1) and/or a heat treatment process (S2). Hereinafter, each process will be described in detail.

[Mixing Process (S10)]

As illustrated in FIG. 1, the mixing process (S10) is a process of mixing a nickel-manganese composite compound, a titanium compound, a niobium compound, and a lithium compound to obtain a mixture. Furthermore, as necessary, a zirconium compound is also mixed. A titanium compound, a niobium compound, a lithium compound, and as necessary a zirconium compound can be added, for example, as powder (solid phase) and mixed. Hereinafter, the respective materials will be described.

(Nickel-Manganese Composite Compound)

The nickel-manganese composite compound to be used in the mixing process (S10) can be obtained by a known method. Since the contents (compositions) of the metals (Ni, Mn, Co, and the like) in the nickel-manganese composite compound are almost maintained also in the lithium-nickel-manganese composite oxide particles, the content of each of the metals is preferably in the same range as the content in the lithium-nickel-manganese composite oxide described above. Note that, the nickel-manganese composite compound to be used in the present embodiment may contain an element other than the aforementioned metal elements (Ni, Mn, Co, and the like), hydrogen, and oxygen at a small amount in the range that does not impair the effect of the present invention.

The nickel-manganese composite compound may be hydroxide or oxide. As the method for producing nickel-manganese composite hydroxide, for example, a method of performing neutralization crystallization using a metal salt aqueous solution and an alkaline solution is exemplified. Furthermore, the nickel-manganese composite compound may be subjected to a heat treatment to remove moisture in the nickel-manganese composite compound or a part or whole of the nickel-manganese composite compound may be converted into nickel-manganese composite oxide. These production methods can obtained, for example, with reference to the methods described in Patent Literature 2 and the like.

(Titanium Compound)

As the titanium compound, a known compound containing titanium can be used. Note that, the titanium compound may be used singly, or two or more kinds thereof may be used.

Among these, a compound containing titanium and oxygen is preferable from the viewpoint of easy availability and of avoiding mixing of impurities into the lithium-nickel-manganese composite oxide. Note that, when impurities are mixed into the lithium-nickel-manganese composite oxide, decreases in thermal stability, battery capacity, and cycle characteristics of the secondary battery obtained may be caused.

(Niobium Compound)

As the niobium compound, a known compound containing niobium can be used. Among these, as the niobium compound, a compound containing niobium and oxygen is preferable from the viewpoint of easy availability and of avoiding mixing of impurities into the lithium-nickel-manganese composite oxide. Note that, when impurities are mixed into the lithium-nickel-manganese composite oxide, decreases in thermal stability, battery capacity, and cycle characteristics of the secondary battery obtained may be caused.

(Lithium Compound)

The lithium compound is not particularly limited, and a known compound containing lithium can be used, and for example, lithium carbonate, lithium hydroxide, lithium nitrate, or a mixture thereof is used. Among these, lithium carbonate, lithium hydroxide, or a mixture thereof is preferable from the viewpoint of being less affected by remaining impurities and melting at the firing temperature.

(Mixing Method)

The method for mixing the nickel-manganese composite compound, the lithium compound, the titanium compound, the niobium compound, and as necessary, the zirconium compound is not particularly limited, and these particles may be sufficiently mixed to the extent to which the shapes of these particles are not destroyed. As the mixing method, for example, mixing can be performed using a general mixer, and for example, mixing can be performed using a shaker mixer, a Loedige mixer, a Julia mixer, a V blender, and the like. Note that, it is preferable to sufficiently mix the titanium mixture before the firing process to be described later. When mixing is not sufficiently performed, the atomic % ratio (Li/Me, corresponding to "a" in the amount of substance ratio) of Li to the metal elements Me (Me=Ni+ Mn+the element M+Ti+Nb in the present embodiment) other than Li may vary between the individual particles of the positive electrode active material and problems may arise that sufficient battery characteristics are not attained.

The lithium compound is mixed so that Li/Me in the mixture is the same as Li/Me in the intended positive electrode active material. This is because Li/Me in the mixture in this mixing process (S10) becomes Li/Me in the lithium-nickel-manganese composite oxide after firing since Li/Me and the molar ratio of the respective metal elements do not change before and after the firing process (S20). Note that, when the subsequent water-washing process (S30) is executed, since a part of the excessive lithium component existing on the surface of the active material is dissolved in water, the Li/Me ratio may be further decreased than the active material obtained after the firing process (S20). The decrease range of the Li/Me ratio varies according to the composition and physical properties of the positive electrode active material and water-washing conditions, but in an example of the production method according to the present embodiment, the Li/Me ratio is decreased by approximately 0.02 by the water-washing process (S30).

Note that, since the contents (ratios) of the niobium (Nb) and titanium (Ti) in the mixture are almost maintained also in the lithium-nickel-manganese composite oxide, the mixing amount of each of the niobium compound and the titanium compound is preferably in the same range as the content of each of niobium and titanium in the lithium-nickel-manganese composite oxide described above.

[Firing Process (S20)]

The firing process (S20) is a process of firing the mixture obtained by the mixing process (S10) to obtain lithium-nickel-manganese composite oxide.

When the mixture is fired, lithium in the lithium compound is diffused in the nickel-manganese composite compound, and thereby the lithium-nickel-manganese composite oxide configured by polycrystal structure particles is formed. The lithium compound melts at a temperature when firing and penetrates into the nickel-manganese composite compound to form a lithium-nickel-manganese composite oxide. At this time, it is considered that niobium and titanium contained in the lithium mixture are also penetrate into the inside of the secondary particle along with the melt lithium compound, and also in the primary particles, they penetrate when there is a crystal grain boundary or the like. Hereinafter, the firing conditions will be specifically described, and the firing conditions are adjusted within the range of the respective firing conditions described below so that the battery characteristics are optimized according to the amount of substance ratio of the metal elements contained in the lithium-nickel-manganese composite oxide.

The firing atmosphere is set to preferably an oxidizing atmosphere, and it is more preferable to increase the oxygen concentration than that in air. By setting an oxidizing atmosphere, it is possible to obtain a positive electrode active material in which thermal stability is improved while a high battery capacity is maintained and both of battery characteristics and thermal stability are achieved.

The firing temperature in an oxidizing atmosphere is 760° C. or higher and 1000° C. or lower, preferably 760° C. or higher and 950° C. or lower. When firing is performed at the above temperature, melting of the lithium compound occurs to promote the penetration and diffusion of titanium. Furthermore, the mixture contains manganese so that the firing temperature can be raised. By raising the firing temperature, diffusion of titanium and niobium is promoted. Further, the crystallinity of the lithium-nickel-manganese composite oxide is increased, and thus a battery capacity can be further improved.

On the other hand, when the firing temperature is lower than 760° C., diffusion of lithium, titanium, and manganese into the nickel-manganese composite compound is not sufficiently performed, excessive lithium or unreacted particles may remain or the crystal structure may not be sufficiently arranged, so that a problem arises in that sufficient battery characteristics are not obtained. Furthermore, when the firing temperature exceeds 1000° C., there is the possibility that sintering violently occurs between the particles of the formed lithium-nickel-manganese composite oxide and abnormal grain growth occurs. When abnormal particle growth occurs, the particles may be too coarse after firing so as to decrease a filling property when the positive electrode active material is formed, and further, problems arise in that the reaction resistance due to the disarrangement of the crystal structure is increased and a discharge capacity decreases.

The firing time is set to preferably at least 3 hours or longer and more preferably 6 hours or longer and 24 hours or shorter. When the firing time is shorter than 3 hours, the lithium-nickel-manganese composite oxide may not be sufficiently generated. Furthermore, a furnace used for firing is not particularly limited as long as a titanium mixture can be fired in an oxygen flow, an electric furnace without gas generation is preferably used, and either of a batch-type furnace or a continuous furnace can be used.

[Water-Washing (S30)]

The water-washing process (S30) is a process of mixing the lithium-nickel-manganese composite oxide obtained in the firing process (S20) and water and stirring the mixture (hereinafter, referred to as "stirring with water") so as to perform solid-liquid separation.

The production method according to the present embodiment includes the water-washing process (S30) and the drying process (S40) to be described below, and thereby the crystallinity of the positive electrode active material and a discharge capacity is improved. Although the details thereof are not clear, for example, it is considered that when lithium in the positive electrode active material is pulled out by stirring with water, the disorder of atomic arrangement is alleviated so that the crystallinity of the positive electrode active material is improved and a high discharge capacity is exhibited. Furthermore, by the water-washing process (S30), an excessive lithium component on the surface is dissolved in water to be removed, and thereby the gelling of a positive electrode mixture paste at the time of producing an electrode plate of a secondary battery can be suppressed.

The amount of water to be mixed in the water-washing process (S30) is preferably 50 parts by mass or more and 200 parts by mass or less with respect to 150 parts by mass of the lithium-nickel-manganese composite oxide. When the mixing ratio of water is 200 parts by mass or more, an excessive amount of lithium is pulled out from the positive electrode active material, so that a decrease in a battery capacity or an increase in reaction resistance may occur. On the other hand, when the mixing ratio of water is less than 50 parts by mass, there is the possibility that the effect of improving crystallinity or removal of excessive lithium components is insufficient, so that a decrease in battery capacity or the gelling of the positive electrode mixture paste occurs. Furthermore, the amount of water to be mixed in the water-washing process (S30) may be 50 parts by mass or more and 200 parts by mass or less with respect to 100 parts by mass of the lithium-nickel-manganese composite oxide.

The time for water-washing is not particularly limited, and for example, is about 1 minute or longer and 2 hours or shorter, and may be 5 minutes or longer and 50 minutes or shorter.

After the lithium-nickel-manganese composite oxide is stirred with water, solid-liquid separation is performed to obtain a lithium-nickel-manganese composite oxide (precipitate). A solid-liquid separation method is not particularly limited, and a known method can be used. For example, solid-liquid separation can be used using one or more kinds selected from a suction filter such as a Nutsche (a Buchner funnel), a filter press, a centrifugal separator, and the like.

[Drying Process (S40)]

The drying process (S40) is a process of drying the lithium-nickel-manganese composite oxide (precipitate) obtained by the water-washing process (S30) to obtain powder (dry powder) of the lithium-metal composite oxide.

Regarding drying conditions, heat treatment is preferably performed in an oxidizing atmosphere or in a vacuum atmosphere at a temperature of 100° C. or higher and 250° C. or lower. When the drying temperature is 100° C. or higher, moisture in the precipitate can be sufficiently evaporated. Furthermore, when the drying temperature is 250° C. or lower, a compact drying apparatus can be used, which is suitable for industrial-scale implementation.

An atmosphere when drying is preferably an atmosphere not containing water vapor or carbon dioxide, and specifically, an oxidizing atmosphere such as an oxygen atmosphere or a vacuum atmosphere is preferable in order to avoid a reaction between moisture or carbonic acid in the atmosphere and a positive electrode active material to be obtained. Furthermore, from the viewpoint that water vapor generated by drying can be rapidly discharged, it is preferable to attach an exhaust system to a drying apparatus.

The drying time is not particularly limited, but in order to sufficiently evaporate moisture of a raw material mixture, the drying time at the maximum attained temperature when drying is set to preferably 0.5 hours or longer. Furthermore, the upper limit of the drying time is set to preferably 48 hours or shorter from the viewpoint of productivity.

3. Lithium Ion Secondary Battery

The lithium ion secondary battery (hereinafter, also referred to as "secondary battery") according to the present embodiment includes a positive electrode containing the positive electrode active material described above, a negative electrode, and a non-aqueous electrolyte. The secondary battery includes, for example, a positive electrode, a negative electrode, and a non-aqueous electrolyte solution. Furthermore, the secondary battery may include, for example, a positive electrode, a negative electrode, and a solid electrolyte. Furthermore, the secondary battery may be any secondary battery which is charged and discharged by de-insertion and insertion of lithium ions and may be, for example, a non-aqueous electrolyte solution secondary battery or an all-solid-state lithium secondary battery. Note that, the embodiment described below is merely an example, and the secondary battery according to the present embodiment can also be applied to forms subjected to various modifications and improvements based on the embodiment described here.

The secondary battery according to the present embodiment can achieve high thermal stability at low cost. Furthermore, the positive electrode active material to be used for the secondary battery can be obtained by the industrial production method as described above. Furthermore, the secondary battery is suitable for a power source of a small portable electronic device (such as a notebook personal computer or a mobile phone terminal) that is required to have a high capacity all the time. Furthermore, the secondary battery is superior not only in capacity but also in durability and thermal stability at the time of overcharge to a battery fabricated using a conventional positive electrode active material of a lithium-cobalt-based oxide or lithium-nickel-based oxide. Hence, the secondary battery is suitably used as a power source for electric cars that are restricted in a mounting space since miniaturization and capacity enlargement thereof are possible. Note that, the secondary battery can be used not only as a power source for an electric car driven purely by electric energy but also as a power source for a so-called hybrid car used together with a combustion engine such as a gasoline engine or a diesel engine.

EXAMPLES

Hereinafter, the present invention will be described in more detail with reference to Examples and Comparative Examples of the present invention, but the present invention is not limited to these Examples at all. Note that, methods for analyzing metals contained in positive electrode active materials and various methods for evaluating the positive electrode active materials in Examples and Comparative Examples are as follows.

(1) Analysis of composition: Measured by ICP emission spectrometry.

(2) Volume average particle size Mv and particle size distribution width [(D90–D10)/average volume particle size]: Performed on a volume basis by a laser diffraction scattering type particle size analyzer (Microtrac HRA manufactured by Nikkiso Co., Ltd.).

(3) Concentration of each element

The positive electrode active material was manufactured so that cross section analysis of primary particles by S-TEM was possible. Twenty primary particles were arbitrarily selected from a plurality of secondary particles contained in the positive electrode active material, and the compositions in a region including cross sections and grain boundaries of individual primary particles were subjected to point analysis by EDX of S-TEM.

(4) Eluted lithium amount: 2 g of the positive electrode active material was fractionated and put into 125 ml of pure water at room temperature stirred with a stirrer, and titration was performed using an HCl aqueous solution having a concentration of 1 mol/L immediately after the active material was put thereinto. The titration was executed under the following conditions using an automatic titrator COM-1750 (manufactured by HIRANUMA Co., Ltd.).

End Point Detection Method: Inflection Point Detection
Detection sensitivity: 2500
Burette model No.: H-1700
Burette speed: 2
Minimum dropping rate: 0.013 mL The titration result was evaluated by the Warder method, lithium hydroxide (LiOH) and lithium carbonate ($Li_2CO_3$) were calculated, and the sum of these lithium amounts was calculated as eluted lithium.

(5) Specific surface area: Measurement was performed by a BET method based on nitrogen adsorption using a specific surface area/pore distribution measuring apparatus (Model No.: Macsorb HM1200 Series manufactured by Mountech Co., Ltd.).

Figure 3:
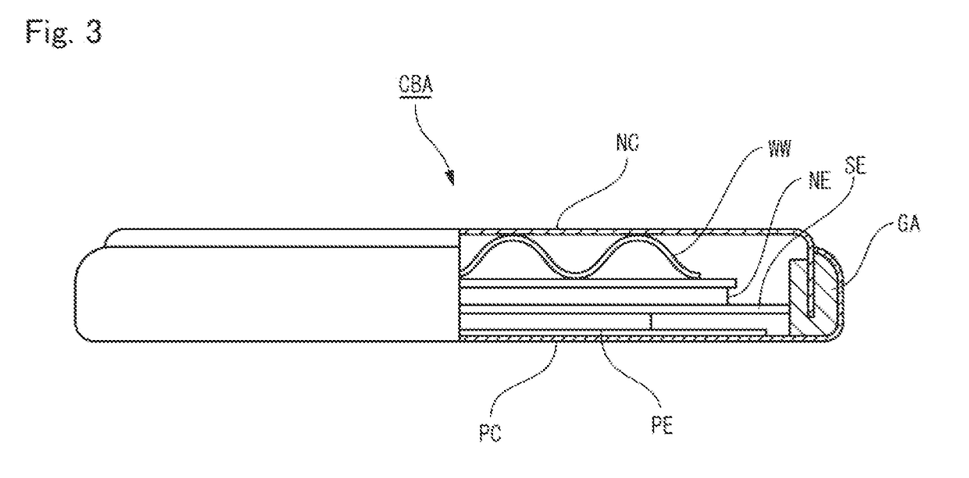
FIG. 3 is a schematic cross-sectional view of a coin-type battery used for battery evaluation.

(6) Initial discharge capacity:

With regard to the initial charge capacity and the initial discharge capacity, a coin-type battery CBA illustrated in FIG. 3 was produced by the following method and then left to stand for about 24 hours to stabilize the open circuit voltage (OCV), then the battery was charged to a cutoff voltage of 4.3 V at a current density of 0.1 mA/cm$^2$ with respect to the positive electrode to take the capacity at this time as the initial charge capacity, the battery paused for one hour and was then discharged to a cutoff voltage of 3.0 V, and the capacity at this time was taken as initial discharge capacity. A multi-channel voltage/current generator (R6741A manufactured by Advantest Corporation) was used to measure the discharge capacity.

(Production of Coin-Type Battery)

52.5 mg of the obtained positive electrode active material, 15 mg of acetylene black, and 7.5 mg of polytetrafluoroethylene resin (PTFE) were mixed and press-molded so as to have a diameter of 11 mm and a thickness of 100 μm at a pressure of 100 MPa, thus manufacturing a positive electrode (electrode for evaluation) PE illustrated in FIG. 3. The manufactured positive electrode PE was dried in a vacuum dryer at 120° C. for 12 hours. Thereafter, using this positive electrode PE, a 2032 type coin-type battery CBA was manufactured in a glove box in an Ar atmosphere with a dew point controlled at −80° C. As a negative electrode NE, lithium (Li) metal having a diameter of 17 mm and a thickness of 1 mm was used. As an electrolyte solution, an equal volume mixed solution (manufactured by Toyama Pharmaceutical Co., Ltd.) of ethylene carbonate (EC) and diethyl carbonate (DEC) containing 1 M LiClO$_4$ as a supporting electrolyte was used. As the separator SE, a polyethylene porous film having a thickness of 25 μm was used.

Furthermore, the coin-type battery CBA was assembled into a coin-type battery by disposing a gasket GA and a wave washer WW and using a positive electrode can PC and a negative electrode can NC. The measurement results of the initial charge and discharge capacity and the positive electrode resistance value of the positive electrode active material thus obtained are presented in Table 2.

(7) Maximum Oxygen Generation Peak Temperature

The thermal stability of the positive electrode was evaluated by quantitatively determining the amount of oxygen released when the positive electrode active material in an overcharged state was heated. A coin-type battery was produced in a similar manner to and subjected to CC charge (constant current-constant voltage charge) at a 0.05 C rate up to a cutoff voltage of 4.3 V. Thereafter, the coin-type battery was disassembled, only the positive electrode was carefully taken out so as not to cause a short circuit, washed with dimethyl carbonate (DMC), and dried. About 2 mg of the dried positive electrode was weighed and heated from room temperature to 450° C. at a temperature rising rate of 10° C./min using a gas chromatograph mass spectrometer (GCMS, QP-2010 plus manufactured by SHIMADZU CORPORATION). Helium was used as the carrier gas. The generation behaviors of oxygen (m/z=32) generated when heating were measured to obtain the maximum oxygen generation peak temperature.

(8) Maximum Oxygen Releasing Rate

The maximum oxygen releasing rate was calculated from a change in weight that is decreased by making the positive electrode active material be in an overcharged state and heating the positive electrode active material. A coin-type battery was produced in a similar manner to (6) and subjected to CC charge (constant current-constant voltage charge) at a 0.05 C rate up to a cutoff voltage of 4.3 V. Thereafter, the coin-type battery was disassembled, only the positive electrode was carefully taken out so as not to cause a short circuit, washed with dimethyl carbonate (DMC), and dried. About 10 mg of the dried positive electrode was weighed and heated from room temperature to 450° C. at a temperature rising rate of 10° C./min using a thermogravimetric analyzer (TG, Thermo plus II manufactured by Rigaku Corporation). The measurement atmosphere was conducted with nitrogen. The weight reduction at the time of heating was differentiated and the largest value was regarded as the maximum oxygen releasing rate. In the present embodiment, a relative value when Comparative Example 1 is regarded as 100% was calculated.

(9) Thermal Runaway Temperature

In order to execute safety evaluation as a battery, a battery using a negative electrode using graphite as a negative electrode active material was produced, and an accelerated rate calorimeter (ARC) measurement test was executed. A method for producing a battery for an ARC measurement test is described below. 95 parts by mass of the positive electrode active material, 3 parts by mass of acetylene black as a conductive material, and 2 parts by mass of polyvinylidene fluoride as a binding agent were mixed. The mixture was kneaded using a kneader (T.K. HIVIS MIX manufactured by PRIMIX Corporation) to prepare a positive electrode mixture slurry. Next, the positive electrode mixture slurry was applied to an aluminum foil having a thickness of 15 μm and the coating film was dried to form a positive electrode active material layer on the aluminum foil. This was cut into a predetermined size to obtain a positive electrode. The produced positive electrode and the negative electrode using graphite as a negative electrode active material were laminated via a separator to opposite to each other, thereby producing an electrode body. Next, a non-aqueous electrolyte using 1.2 M lithium hexafluorophosphate (LiPF6) as a supporting salt and obtained by mixing ethylene carbonate (EC), methyl ethyl carbonate (MEC), and dimethyl carbonate (DMC) at a volume rate of 3:3:4, and the electrode body were inserted in an aluminum outer casing to produce a battery for an ARC measurement test. The thermal runaway temperature of the produced battery was measured using an accelerated rate calorimeter (ARC, manufactured by Thermal Hazard Technology) under the following conditions.

Measurement initiation temperature: 130° C.
Retention time: 20 min
Heat generation detection temperature: 0.02° C./min
Temperature rising width: 5° C.
Battery voltage: Charged state at 4.2 V A temperature when heat generation rate exceeds 10° C./mm n was regarded as the thermal runaway temperature. In the present embodiment, based on the thermal runaway temperature of Comparative Example 1, a difference with thermal runaway temperature of Comparative Example 1 is determined and regarded as a thermal runaway temperature change amount.

Reference Example 1

(Mixing Process)

The particles of nickel-manganese-cobalt composite hydroxide obtained by a known method (the molar ratio of nickel:manganese:cobalt is 85:10:5), lithium hydroxide, titanium oxide, and niobic acid were weighed so that the amount of substance ratio of lithium:(nickel+manganese+cobalt):titanium:niobium was 1.01:0.973:0.022:0.005, and then thoroughly mixed together using a shaker mixer device (TURBULA Type T2C manufactured by Willy A. Bachofen (WAB) AG) to obtain a lithium mixture.

[Firing Process]

The obtained lithium mixture was fired at 870° C. for 10 hours in an oxygen flow, and then was crushed to obtain particles of lithium-nickel-manganese-cobalt composite oxide.

[Evaluation]

The production conditions and evaluation results of the positive electrode active material thus obtained are presented in Tables 1 and 3.

Reference Example 2

A positive electrode active material was obtained and evaluated in a similar manner to Reference Example 1, except that in the mixing process, the obtained particles of nickel-manganese-cobalt composite hydroxide, lithium hydroxide, zirconium oxide, titanium oxide, and niobic acid were weighed so that the amount of substance ratio of lithium:(nickel+manganese+cobalt):zirconium:titanium:niobium was 1.03:0.970:0.003:0.022:0.005 and the firing temperature in the firing process was set to 840° C. The production conditions and evaluation results of the positive electrode active material are presented in Tables 1 and 3.

Reference Example 3

A positive electrode active material was obtained and evaluated in a similar manner to Reference Example 1, except that in the mixing process, the obtained particles of nickel-manganese-cobalt composite hydroxide, lithium hydroxide, zirconium oxide, titanium oxide, and niobic acid were weighed so that the amount of substance ratio of lithium:(nickel+manganese+cobalt):zirconium:titanium:niobium was 1.03:0.970:0.003:0.022:0.005 and the firing temperature in the firing process was set to 800° C. The production conditions and evaluation results of the positive electrode active material are presented in Tables 1 and 3.

Example 1

Water was mixed at a ratio of 100 parts by mass with respect to 150 parts by mass of the lithium-nickel-manganese-cobalt-titanium composite oxide obtained under the same conditions as in Reference Example 1, and was stirred with water and then suction-filtered using a Nutsche so as to obtain a precipitate (water-washing process). The obtained precipitate was put in a SUS container, heated to 100° C. for 12 hours and heated to 190° C. for 10 hours using a vacuum dryer, and left to stand and dried so as to obtain a positive electrode active material (drying process).
[Evaluation]
Evaluation results of the obtained positive electrode active material are shown in Tables 1 to 3. Furthermore, the ratio of the titanium concentration at the grain boundary between primary particles to the titanium concentration inside primary particles in the positive electrode active material of Example 1 (grain boundary/intraparticle) was 0.9, and the condensation of titanium at the grain boundary between primary particles was not observed. Note that, in some of Examples and Comparative Examples, the maximum oxygen releasing rate and/or the thermal runaway temperature is evaluated, and evaluation results thereof are shown in Table 2.

Example 2

A positive electrode active material was obtained and evaluated in a similar manner to Example 1, except that in the mixing process, the obtained particles of nickel-manganese-cobalt composite hydroxide, lithium hydroxide, titanium oxide, and niobic acid were weighed so that the amount of substance ratio:(nickel+manganese+cobalt):titanium:niobium was 1.02:0.975:0.022:0.003. The production conditions and evaluation results of the positive electrode active material are presented in Tables 1 and 3.

Example 3

A positive electrode active material was obtained and evaluated in a similar manner to Example 1, except that in the mixing process, the obtained particles of nickel-manganese-cobalt composite hydroxide, lithium hydroxide, titanium oxide, and niobic acid were weighed so that the amount of substance ratio of lithium:(nickel+manganese+cobalt):titanium:niobium was 1.01:0.972:0.025:0.003. The production conditions and evaluation results of the positive electrode active material are presented in Tables 1 and 3.

Example 4

A positive electrode active material was obtained and evaluated in a similar manner to Example 1, except that in the mixing process, the obtained particles of nickel-manganese-cobalt composite hydroxide, lithium hydroxide, zirconium oxide, titanium oxide, and niobic acid were weighed so that the amount of substance ratio of lithium:(nickel+manganese+cobalt):zirconium:titanium:niobium was 1.01:0.970:0.003:0.022:0.005. The production conditions and evaluation results of the positive electrode active material are presented in Tables 1 to 3.

Example 5

A positive electrode active material was obtained and evaluated in a similar manner to Example 1, except that in the mixing process, the obtained particles of nickel-manganese-cobalt composite hydroxide, lithium hydroxide, zirconium oxide, titanium oxide, and niobic acid were weighed so that the amount of substance ratio of lithium (nickel+manganese+cobalt):zirconium:titanium:niobium was 1.03:0.970:0.003:0.022:0.005 and the firing temperature in the firing process was set to 860° C. The production conditions and evaluation results of the positive electrode active material are presented in Tables 1 to 3.

Example 6

A positive electrode active material was obtained and evaluated in a similar manner to Example 1, except that in the mixing process, the obtained particles of nickel-manganese-cobalt composite hydroxide, lithium hydroxide, zirconium oxide, titanium oxide, and niobic acid were weighed so that the amount of substance ratio of lithium (nickel+manganese+cobalt):zirconium:titanium:niobium was 1.03:0.970:0.003:0.022:0.005 and the firing temperature in the firing process was set to 840° C. Note that, water-washing was performed using the lithium-nickel-manganese-cobalt-titanium composite oxide obtained under the same conditions as in Reference Example 2. The production conditions and evaluation results of the positive electrode active material are presented in Tables 1 to 3.

Example 7

A positive electrode active material was obtained and evaluated in a similar manner to Example 1, except that in the mixing process, the obtained particles of nickel-manganese-cobalt composite hydroxide, lithium hydroxide, zirconium oxide, titanium oxide, and niobic acid were weighed so that the amount of substance ratio of lithium:(nickel+manganese+cobalt):zirconium:titanium:niobium was 1.03:0.970:0.003:0.022:0.005 and the firing temperature in the firing process was set to 800° C. Note that, water-washing was performed using the lithium-nickel-manganese-cobalt-titanium composite oxide obtained under the same conditions as in Reference Example 3. The production conditions and evaluation results of the positive electrode active material are presented in Tables 1 to 3.

Comparative Example 1

A positive electrode active material was obtained and evaluated in a similar manner to Example 1, except that in the mixing process, a titanium compound and a niobium compound were not prepared the obtained particles of nickel-manganese-cobalt composite hydroxide and lithium hydroxide were weighed so that the amount of substance ratio of lithium:nickel:manganese:cobalt was 1.02:0.85:0.10:0.05, and the firing temperature in the firing process was set to 800° C. The production conditions and evaluation results of the positive electrode active material are presented in Tables 1 and 2.

(Comparative Example 2)

A positive electrode active material was obtained and evaluated in a similar manner to Example 1, except that in the mixing process, a titanium compound was not prepared, the obtained particles of nickel-manganese-cobalt composite hydroxide, lithium hydroxide, and niobic acid were weighed so that the amount of substance ratio of lithium:(nickel+manganese+cobalt):niobium was 1.02:0.99:0.010, and the firing temperature in the firing process was set to 850° C. The production conditions and evaluation results of the positive electrode active material are presented in Tables 1 and 2.

Comparative Example 3

A positive electrode active material was obtained and evaluated in a similar manner to Example 1, except that in the mixing process, the obtained particles of nickel-manganese-cobalt composite hydroxide, lithium hydroxide, titanium oxide, and niobic acid were weighed so that the amount of substance ratio of lithium:(nickel+manganese+cobalt):titanium:niobium was 1.01:0.977:0.022:0.001. The production conditions and evaluation results of the positive electrode active material are presented in Table 1.

TABLE 2

|  | Maximum oxygen releasing rate % | Thermal runaway temperature ° C. |
|---|---|---|
| Example 1 | 39 | +11 |
| Example 4 | 32 | — |
| Example 5 | 36 | — |
| Example 6 | 39 | — |
| Example 7 | 54 | — |
| Comparative Example 1 | 100 | 0 |
| Comparative Example 2 | 75 | — |

TABLE 3

|  |  |  | Positive electrode active material | | Battery evaluation |
|---|---|---|---|---|---|
|  | Firing temperature ° C. | Water-washing — | Eluted lithium amount wt % | Specific surface area m²/g | Discharge capacity mAh/g |
| Example 1 | 870 | Presence | 0.05 | 0.94 | 198 |
| Example 2 | 870 | Presence | 0.04 | 0.89 | 204 |
| Example 3 | 870 | Presence | 0.06 | 0.92 | 202 |

TABLE 1

| | | | Positive electrode active material | | | | | | | |
|---|---|---|---|---|---|---|---|---|---|---|
| | Firing temperature ° C. | Water-washing — | Amount of substance ratio | | | | | | | Ti/Nb amount of substance ratio — |
| | | | Li a | Ni b | Mn c | Co d | Zr e | Ti f | Nb g | |
| Example 1 | 870 | Presence | 0.99 | 0.826 | 0.097 | 0.049 | — | 0.022 | 0.005 | 4.4 |
| Example 2 | 870 | Presence | 1.00 | 0.830 | 0.096 | 0.050 | — | 0.022 | 0.003 | 7.3 |
| Example 3 | 870 | Presence | 0.99 | 0.827 | 0.095 | 0.050 | — | 0.025 | 0.003 | 8.3 |
| Example 4 | 870 | Presence | 0.99 | 0.827 | 0.095 | 0.048 | 0.003 | 0.022 | 0.005 | 4.4 |
| Example 5 | 860 | Presence | 1.01 | 0.827 | 0.097 | 0.046 | 0.003 | 0.022 | 0.005 | 4.4 |
| Example 6 | 840 | Presence | 1.01 | 0.823 | 0.097 | 0.050 | 0.003 | 0.022 | 0.005 | 4.4 |
| Example 7 | 800 | Presence | 1.01 | 0.827 | 0.092 | 0.051 | 0.003 | 0.022 | 0.005 | 4.4 |
| Comparative Example 1 | 800 | Absence | 1.02 | 0.852 | 0.098 | 0.050 | — | — | — | — |
| Comparative Example 2 | 850 | Absence | 1.00 | 0.844 | 0.103 | 0.043 | — | — | 0.010 | — |
| Comparative Example 3 | 840 | Absence | 1.01 | 0.832 | 0.096 | 0.049 | — | 0.022 | 0.001 | 22.0 |

| | Positive electrode active material | | | | | Battery evaluation | |
|---|---|---|---|---|---|---|---|
| | Grain boundary/intra-particle Nb concentration — | Eluted lithium amount wt % | Specific surface area m²/g | Volume average particle size MV μm | Particle size distribution width — | Discharge capacity mAh/g | Maximum oxygen generation peak temperature ° C. |
| Example 1 | 1.5 | 0.05 | 0.94 | 14.2 | 0.96 | 198 | 258 |
| Example 2 | 1.5 | 0.04 | 0.89 | 13.8 | 0.98 | 204 | 251 |
| Example 3 | 1.6 | 0.06 | 0.92 | 14.1 | 0.95 | 202 | 253 |
| Example 4 | 1.6 | 0.04 | 0.72 | 16.3 | 1.03 | 195 | 255 |
| Example 5 | 1.6 | 0.06 | 1.06 | 14.6 | 0.95 | 201 | 257 |
| Example 6 | 1.7 | 0.08 | 0.99 | 13.2 | 0.89 | 202 | 254 |
| Example 7 | 1.5 | 0.13 | 1.25 | 12.7 | 0.89 | 203 | 258 |
| Comparative Example 1 | — | 0.22 | 0.26 | 13.9 | 0.87 | 211 | 217 |
| Comparative Example 2 | 1.6 | 0.24 | 0.20 | 15.4 | 0.90 | 198 | 226 |
| Comparative Example 3 | 1.1 | 0.23 | 0.20 | 14.8 | 0.97 | 196 | 227 |

TABLE 3-continued

|  | Firing temperature ° C. | Water-washing | Positive electrode active material | | | Battery evaluation Discharge capacity mAh/g |
|---|---|---|---|---|---|---|
|  |  |  | Eluted lithium amount wt % | Specific surface area m²/g | | |
| Example 4 | 870 | Presence | 0.04 | 0.72 | | 195 |
| Example 5 | 860 | Presence | 0.06 | 1.06 | | 201 |
| Example 6 | 840 | Presence | 0.08 | 0.99 | | 202 |
| Example 7 | 800 | Presence | 0.13 | 1.25 | | 203 |
| Reference Example 1 | 870 | Absence | 0.21 | 0.31 | | 191 |
| Reference Example 2 | 840 | Absence | 0.21 | 0.25 | | 189 |
| Reference Example 3 | 800 | Absence | 0.32 | 0.18 | | 187 |

(Evaluation Results)

As shown in Table 1, it is clear that since the positive electrode active materials obtained in Examples have a maximum oxygen generation peak temperature of 250° C. or higher and an eluted lithium amount of 0.20% by mass or less, high thermal stability is attained, oxygen releasing at the time of overcharge is suppressed, and gelling of the paste at the time of producing an electrode plate can be suppressed. Furthermore, the ratio of the titanium concentration at the grain boundary between primary particles to the titanium concentration inside primary particles in the positive electrode active material of Example (grain boundary/intraparticle) was 0.8 or more and 1.1 or less, and the condensation of titanium at the grain boundary between primary particles was not observed.

Furthermore, as presented in Table 2, with respect to Comparative Example 1 not containing titanium and niobium, in the positive electrode active materials obtained in Examples, the maximum oxygen releasing rate was 60% or less and the thermal runaway temperature was also +8° C. or higher. Also from this result, it was shown that in the positive electrode active materials of Examples, oxygen releasing at the time of overcharge is suppressed, a self-generated heat initiation temperature is higher, and thermal stability is improved.

On the other hand, in Comparative Example 1 not added with titanium and niobium, the maximum oxygen generation peak temperature was lower than 250° C., and thermal stability was lower than Examples. Furthermore, also in Comparative Example 2 added with only titanium or Comparative Example 3 having a small amount of niobium added, similarly, the maximum oxygen generation peak temperature was lower than 250° C., and thermal stability was lower than Examples.

Furthermore, as presented in Table 3, with respect to Reference Examples 1 to 3 in which titanium and niobium were added and the water-washing process was not executed, in Examples in which the water-washing process was executed, the eluted alkali amount was low, a gap was formed in the vicinity of the grain boundary on the active material surface by a decrease in the excessive alkaline component on the surface, so that the specific surface area was high, and a discharge capacity was high. From this result, it is clear that battery characteristics are more favorable in Examples than in Reference Examples in which the water-washing process is not executed and the excessive alkaline component is not reduced.

INDUSTRIAL APPLICABILITY

In the present embodiment, a positive electrode active material for a lithium ion secondary battery having high thermal stability and excellent battery characteristics can be obtained by an industrial production method. This lithium ion secondary battery is suitable for a power source of a small portable electronic device (such as a notebook personal computer or a mobile phone terminal) that is required to have a high capacity all the time.

Furthermore, the secondary battery using the positive electrode active material according to the present embodiment is excellent in thermal stability and further excellent in capacity also in comparison with a battery using a conventional positive electrode active material of a lithium-nickel-based oxide. Hence, the secondary battery is suitably used as a power source for electric cars that are restricted in a mounting space since miniaturization thereof is possible.

Furthermore, the secondary battery using the positive electrode active material according to the present embodiment can be used not only as a power source for electric cars driven purely by electric energy but also as a power source and a stationary storage battery for so-called hybrid cars used together with a combustion engine such as a gasoline engine or a diesel engine.

Note that, the technical scope of the present invention is not limited to the aspects described in the above embodiment and the like. One or more of the requirements described in the above embodiment and the like may be omitted. Furthermore, the requirements described in the above embodiment and the like can be combined as appropriate. In addition, to the extent permitted by law, the disclosure of Japanese Patent Application No. 2019-127262, which is a Japanese patent application, and all the literatures cited in this specification is incorporated as part of the description of the text.

The invention claimed is:

1. A positive electrode active material for a lithium ion secondary battery, the positive electrode active material comprising a lithium-nickel-manganese composite oxide having a hexagonal layered structure and configured by secondary particles with a plurality of aggregated primary particles,
    wherein metal elements constituting the lithium-nickel-manganese composite oxide include lithium (Li), nickel (Ni), manganese (Mn), cobalt (Co), titanium (Ti), niobium (Nb), and optionally zirconium (Zr),
    an amount of substance ratio of the metal elements is represented as Li:Ni:Mn:Co:Zr:Ti:Nb=a:b:c:d:e:f:g (provided that, $0.97 \leq a \leq 1.10$, $0.80 \leq b \leq 0.88$, $0.04 \leq c \leq 0.12$, $0.04 \leq d \leq 0.10$, $0 \leq e \leq 0.004$, $0.003 < f \leq 0.030$, $0.001 < g \leq 0.006$, and $b+c+d+e+f+g=1$),
    in the amount of substance ratio, $(f+g) \leq 0.030$ and $f > g$ are satisfied,
    niobium is segregated at a grain boundary between primary particles of the lithium-nickel-manganese composite oxide, and
    an amount of lithium to be eluted in water when the positive electrode active material is immersed in water is 0.20% by mass or less with respect to the entire positive electrode active material.

2. The positive electrode active material for a lithium ion secondary battery according to claim 1, wherein the amount of substance ratio of the metal elements is represented as Li:Ni:Mn:Co:Zr:Ti:Nb=a:b:c:d:e:f:g (provided that, $0.97 \leq a \leq 1.10$, $0.80 \leq b \leq 0.88$, $0.04 \leq c \leq 0.12$, $0.04 \leq d \leq 0.10$, $0 \leq e \leq 0.004$, $0.003 < f \leq 0.030$, $0.003 \leq g \leq 0.006$, and $b+c+d+e+f+g=1$).

3. The positive electrode active material for a lithium ion secondary battery according to claim 1, wherein an amount of lithium eluted in water when the positive electrode active material is immersed in water is 0.10% by mass or less with respect to the whole positive electrode active material.

4. The positive electrode active material for a lithium ion secondary battery according to claim 1, wherein a niobium concentration at the grain boundary between primary particles, as determined by point analysis using STEM-EDX, with respect to a niobium concentration inside primary particles of the lithium-nickel-manganese composite oxide is 1.3 times or more.

5. The positive electrode active material for a lithium ion secondary battery according to claim 1, wherein a titanium concentration at the grain boundary between primary particles, as determined by point analysis using STEM-EDX, with respect to a titanium concentration inside primary particles of the lithium-nickel-manganese composite oxide is less than 1.3 times.

6. The positive electrode active material for a lithium ion secondary battery according to claim 1, wherein [(D90−D10)/Mv] indicating a particle size distribution width calculated by D90, D10 and a volume average particle size (Mv) in a particle size distribution by a laser diffraction scattering method is 0.80 or more and 1.20 or less.

7. The positive electrode active material for a lithium ion secondary battery according to claim 1, wherein a volume average particle size Mv is 8 μm or more and 20 μm or less.

8. A lithium ion secondary battery comprising: a positive electrode; a negative electrode; and a non-aqueous electrolyte, the positive electrode containing the positive electrode active material for a lithium ion secondary battery according to claim 1.

* * * * *